US011198090B2

(12) United States Patent
Baek et al.

(10) Patent No.: US 11,198,090 B2
(45) Date of Patent: Dec. 14, 2021

(54) METHOD FOR REGENERATING AN AMINE-BASED, ACID GAS ABSORBENT USING A CATALYST MIXTURE CONTAINING SILVER OXIDE AND SILVER CARBONBATE

(71) Applicant: KOREA INSTITUTE OF ENERGY RESEARCH, Daejeon (KR)

(72) Inventors: Il Hyun Baek, Daejeon (KR); Sung Chan Nam, Daejeon (KR); Sung Youl Park, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 274 days.

(21) Appl. No.: 16/500,287

(22) PCT Filed: Feb. 18, 2019

(86) PCT No.: PCT/KR2019/001893
§ 371 (c)(1),
(2) Date: Oct. 2, 2019

(87) PCT Pub. No.: WO2020/071596
PCT Pub. Date: Apr. 9, 2020

(65) Prior Publication Data
US 2020/0330920 A1 Oct. 22, 2020

(30) Foreign Application Priority Data
Oct. 2, 2018 (KR) .................. 10-2018-0117295

(51) Int. Cl.
*B01D 53/14* (2006.01)
*B01J 23/50* (2006.01)

(52) U.S. Cl.
CPC ..... *B01D 53/1425* (2013.01); *B01D 53/1493* (2013.01); *B01J 23/50* (2013.01);
(Continued)

(58) Field of Classification Search
CPC ........... B01D 2252/20447; B01D 2252/20484; B01D 2252/20489; B01D 2257/504;
(Continued)

(56) References Cited

U.S. PATENT DOCUMENTS 8,404,900 B2 3/2013 Kim et al.
8,920,544 B2 12/2014 Menzel et al.

FOREIGN PATENT DOCUMENTS

KR 10-2010-0047068 A 5/2010
KR 10-2011-0032940 A 3/2011
(Continued)

OTHER PUBLICATIONS

Cristina Perinu et al., "NMR spectroscopy applied to amine—CO2—H2O systems relevant for post-combustion CO2 capture: A review", International Journal of Greenhouse Gas Control, vol. 20, pp. 230-243, 2014.

*Primary Examiner* — Cabrena Holecek
(74) *Attorney, Agent, or Firm* — Rabin & Berdo, P.C.

(57) ABSTRACT

A method for regenerating an amine-based, acid gas absorbent using a mixed catalyst containing silver oxide and silver carbonate includes the steps of absorbing an acid gas into an acid gas absorbent having an amine group to obtain an acid gas-absorbed absorbent; and regenerating the amine-based, acid gas absorbent by adding a catalyst mixture containing silver oxide and silver carbonate to the acid gas-absorbed absorbent and by removing the acid gas at a temperature ranging from 40° C. to 86° C. When the amine-based acid gas absorbent is an acid gas absorbent solution and when the acid gas that is absorbed into the acid gas absorbent solution is carbon dioxide, the catalyst mixture efficiently promotes decomposition of carbon dioxide-
(Continued)

bound carbamate in the acid gas absorbent solution that absorbs the carbon dioxide through a novel catalytic reaction pathway.

7 Claims, 8 Drawing Sheets

(52) U.S. Cl.
CPC ........... *B01D 2252/20447* (2013.01); *B01D 2252/20484* (2013.01); *B01D 2257/504* (2013.01)

(58) Field of Classification Search
CPC ........ B01D 2258/0283; B01D 2258/05; B01D 53/1425; B01D 53/1462; B01D 53/1493; B01J 23/50; Y02C 20/40
See application file for complete search history.

(56) References Cited

FOREIGN PATENT DOCUMENTS

| KR | 10-2013-9000375 A | | 1/2013 | |
|----|-------------------|---|--------|---|
| KR | 10-2014-0006311 A | | 1/2014 | |
| KR | 10-2014-0115089 A | | 9/2014 | |
| KR | 20140115089 A | * | 9/2014 | ......... B01D 53/1425 |

* cited by examiner

Figure S2: $CO_2$ desorption curve for MEA without catalyst as a function of time and temperature.

METHOD FOR REGENERATING AN AMINE-BASED, ACID GAS ABSORBENT USING A CATALYST MIXTURE CONTAINING SILVER OXIDE AND SILVER CARBONBATE

TECHNICAL FIELD

The present invention relates to a method for regenerating an acid gas absorbent, and more particularly, to a method for regenerating acid gas absorbent using a mixed catalyst of silver oxide ($Ag_2O$) and silver carbonate ($Ag_2CO_3$) in an acid gas absorbent regeneration process of an acid gas capture process using an amine-based absorbent.

BACKGROUND ART

As the industry is advanced and modern life is improved, the problem of disposal of high concentration of organic waste such as livestock manure and food waste is serious. Many studies have been made to resource organic waste, and the use of biogas derived from organic waste is drawing attention. The main components of these organic waste biogases are methane ($CH_4$) 50% to 75 vol. %, Carbon dioxide ($CO_2$) 25 to 45 vol. %, Hydrogen sulfide ($H_2S$) 2,000 to 3,000 ppm, moisture and other 5 vol. %, so these contain large amounts of acid gas. Methane ($CH_4$) and carbon dioxide ($CO_2$), which make up most of the biogas composition, are the representative greenhouse gases that need to be collected and resourceized, and high-purity purification is essential to resource them.

As a technique for separating acidic gases, including carbon dioxide, from organic waste resources, chemical absorption, physical absorption, or membrane separation is known, and chemical absorption method having high absorption efficiency is mainly used in industrial sites. The chemical absorption method is operated by commercially using the wet absorption technique and the dry absorption technique, and the efficiency of the wet absorption technique is high.

Among the chemical absorption methods, the carbon dioxide absorption process using an amine absorbent is a chemical absorption process using an alkanolamine as an absorbent in which an amine and a hydroxyl group are bonded to an alkyl group, and it consists of an absorption tower that selectively absorbs carbon dioxide from the inlet gas, a regeneration tower (heating regeneration tower) that regenerates the absorber that absorbed carbon dioxide, and auxiliary equipment. The process is known as a process that can effectively capture the carbon dioxide generated in the energy-consuming process used in various industries, including power plants, alkanolamines, in particular monoethanolamine (MEA), diethanolamine (DEA) and methyldiethanolamine (MDEA) are typical amine absorbents. In order to develop various absorbents in addition to amine absorbents, research is being conducted, but development of absorbents having higher efficiency than amine absorbents such as cost, operating equipment, and carbon dioxide absorption rate is limited.

The amine absorbent can recover carbon dioxide with an efficiency of about 75-90%, but despite this high separation efficiency, the technology has problems such as high thermal energy required for absorbent regeneration, limitation of amine concentration in solution due to problems of corrosion of the device, water removal from the recovery gas, loss of absorbent due to volatility, deterioration of absorbent due to additives or high heat, oxidation of absorbent due to bonding with oxygen, and the like. The energy required for the $CO_2$ absorption process generally consists of regeneration energy (about 75%) and other process energy (about 25%), of which regeneration heat consists of process heat and reaction heat. To reduce the regeneration energy, process heat that accounts for most of the regeneration energy must be reduced.

In order to solve this problem, researches for energy saving required for carbon dioxide capture and absorbent regeneration are being actively conducted. For example, new amine absorbents, different phase absorbents, regeneration enhancing additives and the like are being developed. Korean Patent Publication No. 2014-0006311 discloses a method of regenerating the absorbent by supplying calcium ions to the carbon dioxide-absorbed absorbent and depositing it with calcium carbonate. However, this takes a long time to precipitate into calcium carbonate from the amine absorbing carbon dioxide, and further requires a step of removing the precipitated calcium carbonate.

Therefore, the development of technology for reducing the energy required for the regeneration process of the carbon dioxide absorbent is required.

PRIOR ART DOCUMENTS

Patent Document

Korean Patent Publication No. 2014-000631

DETAILED DESCRIPTION OF THE INVENTION

Technical Problem

The present invention provides a method for reducing the energy required for absorbent regeneration by absorbing the acid gas using the acid gas absorbent, and by promoting the regeneration using silver oxide and silver carbonate catalyst, to solve the above problems.

Technical Solution

To address the above-described drawbacks, the inventors of the present invention found that regeneration energy can be saved by using silver oxide ($Ag_2O$) and silver carbonate ($Ag_2CO_3$) mixed catalyst for regeneration of acid gas absorbent during acid gas collection process, so that the present invention was completed.

According to an aspect of the present invention, there is provided a method for regeneration of acid gas absorbents using mixed catalyst of silver oxide and silver carbonate, the method comprising the steps of: absorbing an acid gas into an amine group acid gas absorbent to obtain an acid gas-absorbed absorbent; and regenerating the absorbent by adding a silver oxide and silver carbonate mixture catalyst to the acid gas-absorbed absorbent and removing the acid gas at a temperature range of from about 40° C. to about 86° C.

In some embodiments, the absorbent may be one or more selected from the group consisting of monoethanolamine (MEA), diethanolamine (DEA), triethanolamine (TEA), tetraethylenepentamine (TEPA), triethylenetetramine (TETA), N-methyl diethanolamine (MDEA), 3-isobutoxypropylamine, dimethylaminoethylamine, Diglycolamine (DGA), hexylamine, 2-amino-2-methylpropanol (AMP), hexamethylenediamine (HMDA), propylamine, dipropylamine, butylamine, Isobutylamine, 2-ethylhexylamine, 4-aminobutanol, 3-methoxypropylamine, allylamine, methyldiallylamine, pentylamine, isoamylamine, N-methylethylamine, 2-octylamine, 2-hydroxyethylaminopropylamine, piperazine and triisopropanolamine (TIPA).

In some embodiments, the amine group acid gas absorbent is monoethanolamine (MEA) or piperazine.

In some embodiments, the silver oxide and silver carbonate mixed catalyst are added in an amount of 0.1 to 20 parts by weight based on the weight of the absorbent.

In some embodiments, the silver oxide and silver carbonate mixture is mixed in a weight ratio of 1:0.1 to 1:2.

In some embodiments, the method also comprises the steps of: reusing a recycled acid gas absorbent to acid gas absorption; and reusing the recovered the silver oxide and silver carbonate mixed catalyst to regenerate the absorbent.

In some embodiments, the acid gas is carbon dioxide, and the silver oxide and silver carbonate mixed catalyst promotes decomposition of carbamate in the absorbent solution absorbing carbon dioxide.

Advantageous Effects

The method for regenerating acid gas using silver oxide and silver carbonate catalysts, particularly carbon dioxide absorbents, of the present invention promotes the decomposition of carbon dioxide-bound carbamate from carbon dioxide-absorbed absorbents using silver oxide and silver carbonate mixed catalysts through a novel catalytic reaction pathway to efficiently remove carbon dioxide from the absorbent. It is possible to regenerate the absorbent with a regeneration heat lower than the heat of the conventional absorbent regeneration, it is possible to regenerate the absorbent and capture carbon dioxide at a high efficiency and low cost.

Compared with the conventional regeneration temperature of the absorbent using a monoethanolamine is 120° C. or more, the regeneration method of the present invention can significantly reduce the energy required for regeneration by lowering the regeneration temperature required for the removal of carbon dioxide to the temperature range of 40° C. to 86° C.

EMBODIMENT

Figure 1:
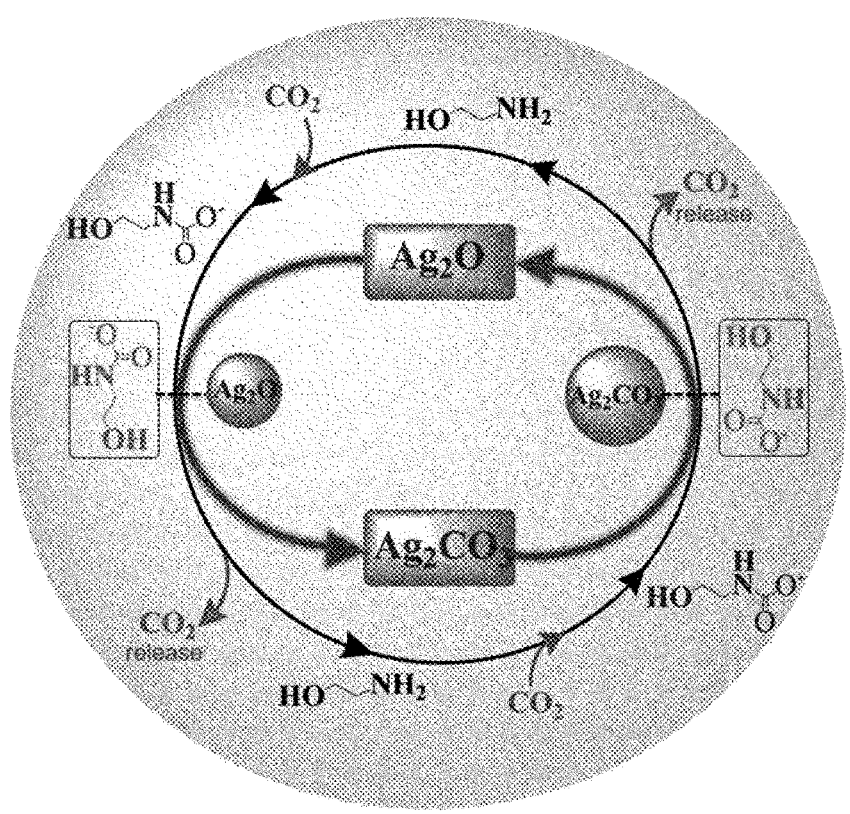
FIG. 1 illustrates the reaction pathway of the catalyst promoting carbon dioxide absorbent regeneration according to one embodiment of the present invention.

Prior to the description of the invention, the terms or words used in the specification and claims described below should not be construed as limiting in their usual or dictionary meanings. Therefore, the embodiments described in the specification and the drawings shown in the drawings are only the most preferred embodiments of the present invention and do not represent all of the technical idea of the present invention, it should be understood that there may be variations and various equivalents that may be substituted for them at the time of the present application.

In the drawings illustrating embodiments of the present invention, like numbers refer to like elements throughout, and detailed description of the same or like elements are not repeated.

In one embodiment, the present invention provides a method for regeneration of acid gas absorbent using mixed catalyst of silver oxide ($Ag_2O$) and silver carbonate ($Ag_2CO_3$), the method comprising the steps of: obtaining an acid gas-absorbed absorbent by absorbing an acid gas into an amine acid gas absorbent; And regenerating the absorbent by adding a silver oxide and silver carbonate mixture catalyst to the acid gas-absorbed absorbent and removing the acid gas at a temperature range of 40° C. to 86° C. In the present invention, the acid gas may be, for example, biogas from organic waste resources, preferably biogas containing carbon dioxide, carbon dioxide is described herein as an example of an acid gas, however, embodiments are not limited thereto.

The method for regeneration of absorbent of the present invention may be performed in a regeneration tower during the capture and regeneration process of the carbon dioxide capture device having an absorption tower and a regeneration tower. In the carbon dioxide capture process, the carbon dioxide contained in the exhaust gas injected into the absorption tower is chemically absorbed, and the carbon dioxide-absorbed absorbent solution is injected into the regeneration tower and regenerated. The preferred temperature when absorbing carbon dioxide of the absorption tower is in the range of about 0° C. to about 80° C., more preferably in the range of about 20° C. to about 60° C., and the preferred pressure is from atmospheric pressure to about 80 atmospheres, more preferably from atmospheric pressure to 60 atmospheres. When absorbing carbon dioxide, the lower the temperature and the higher the pressure, the higher the amount of carbon dioxide absorption. An absorbent used in the absorption tower may use an amine compound, and the amine compound is not limited to any one as long as it is an amine compound commonly used as a carbon dioxide absorbent. For example, the amine compound is at least one primary, secondary, tertiary or sterically hindered amine or amino acid salt chemical. When carbon dioxide and amine react in the absorption tower, carbon dioxide can be absorbed while forming carbamate (2RNH$_2$+ CO$_2$=RNHCOO$^-$.RNH$^{3+}$). In some embodiments, the absorbent may be one or more selected from the group consisting of monoethanolamine (MEA), diethanolamine (DEA), triethanolamine (TEA), tetraethylenepentamine (TEPA), triethylenetetramine (TETA), N—N-methyl diethanolamine (MDEA), 3-isobutoxypropylamine, dimethylaminoethylamine, diglycolamine (DGA), hexylamine, 2-amino-2-methylpropanol (AMP), hexamethylenediamine (HMDA), propylamine, dipropylamine, butylamine, isobutylamine, 2-ethylhexylamine, 4-aminobutanol, 3-methoxypropylamine, allylamine, methyldiallylamine, pentylamine, isoamylamine, N-methylethylamine, 2-octylamine, 2-hydroxyethylaminopropylamine, piperazine and triisopropanolamine (TIPA). Preferably monoethanolamine (MEA) or piperazine.

The carbon dioxide-absorbed absorbent decomposes (desorbs, degasses or separates) the carbon dioxide from the absorbent as the carbamate decomposes in the regeneration tower and the absorbent is regenerated. In one embodiment, the regeneration tower may use a distillation column, which may efficiently perform regeneration of the carbon dioxide absorbent. In the regeneration tower of the present invention, a mixed catalyst of silver oxide and silver carbonate is used to more effectively remove carbon dioxide from the carbon dioxide-absorbed absorbent and regenerate the absorbent. Schemes (Eq.) 1 to 5 below represent reaction pathways for CO$_2$ uptake in monoethanolamine (MEA) through the formation of carbamate, protonated amine, carbonate and bicarbonate. In MEA, CO$_2$ is mainly absorbed in the form of carbamate, carbonate and bicarbonate. Carbon dioxide stripping is performed in the reverse order of the above reaction, and one of the main reasons for the high heat capacity of MEA solvent regeneration is the difficulty of proton migration from protonated amines to water.

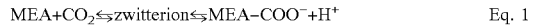

MEA+CO$_2$⇌zwitterion⇌MEA–COO$^-$+H$^+$     Eq. 1

CO$_2$+H$_2$O⇌CO$_2^{-2}$+2H$^+$     Eq. 2

CO$_2$+H$_2$O⇌HCO$_3^-$+H$^+$     Eq. 3

MEAH$^+$+HCO$_3^-$⇌MEA+H$_2$O+CO$_2$     Eq. 4

MEAH$^+$+H$_2$O⇌MEA+H$_3$O$^+$     Eq. 5

FIG. 1 illustrates the absorption and regeneration cycles of carbon dioxide reacted with carbon dioxide, absorbent and catalysts of the present invention. Addition of the catalyst Ag$_2$O of the present invention to the MEA regeneration step converts to Ag$_2$CO$_3$, and addition of Ag$_2$CO$_3$ to the MEA regeneration step results in conversion to Ag$_2$O. The silver oxide and silver carbonate combine with carbamate and release carbon dioxide in the step of regenerating the absorbent from the carbon dioxide-absorbed absorbent, and are reversibly present in the form of oxides, carbonates and carbonates. The catalyst of the present invention can participate in the reaction of exchanging protons and can accelerate the removal of carbon dioxide. The catalyst can bind to carbamate, carbonate and bicarbonate species present in solution to release carbon dioxide via a route with low activation energy (Scheme 4 and 5). The metal atom of the catalyst is attached to the carbamate to participate in the proton donating/accepting reaction, and the amine radical of the carbamate may bind to silver oxide and silver carbonate and weaken the NC bond as the chemical shift of the carbamate proton changes. When the N—C bond of carbamate is weakened due to the activity of the catalyst, the bond is broken even with relatively weak thermal energy and carbon dioxide is released. When the silver oxide and silver carbonate mixed catalyst of the present invention is added to the carbon dioxide-absorbed absorbent regeneration step, since a large amount of carbon dioxide is released at low temperature, it is very efficient and the carbon dioxide removal rate is remarkably improved, thereby energy required for regenerating the absorbent can be minimized.

In one embodiment of the present invention, the silver oxide and silver carbonate mixed catalyst may be added in an amount of 0.1 parts by weight to 20 parts by weight based on 100 parts by weight of the absorbent. If the amount is less than 0.1 parts by weight, the catalytic activity is insignificant, and if it is more than 20 parts by weight, the catalyst function may be degraded due to agglomeration between the catalysts in the absorption solution, and there may be a catalyst that does not participate in the reaction, which is uneconomical. The silver oxide and silver carbonate may be mixed in a weight ratio of 1:0.1 to 1:2. Regeneration of the carbon dioxide absorbent of the present invention is carried out in the temperature range of 40° C. to 86° C. Compared with the conventional regeneration temperature of the absorbent using a monoethanolamine is 120° C. or more, the regeneration method of the present invention lowering the regeneration temperature required for the removal of carbon dioxide can save energy, can quickly separate carbon dioxide. Absorbent from which carbon dioxide has been removed can be reused by separating the metal oxide and supplying it to the absorption tower, and the silver oxide and silver carbonate catalyst can be recovered and reused for regeneration of the absorbent.

Hereinafter, examples are provided to help understanding of the present invention. However, the following examples are provided only to more easily understand the present invention, and the present invention is not limited to the following examples.

EXAMPLE

Example 1. Regeneration of Carbon Dioxide Absorber Using Mixed Oxide of Silver Oxide and Silver Carbonate In order to investigate the regeneration effect of the carbon dioxide absorbents of the mixed catalyst of silver oxide (Ag$_2$O) and silver carbonate (Ag$_2$CO$_3$), an amine-based compound having a purity of 99% monoethanolamine (MEA) was purchased from Acros Co., Ltd., and Ag$_2$O with a purity of 99% was purchased from Sigma-Aldrich. Carbon dioxide and nitrogen gas was purchased from Korea Nano Gas Co., Ltd. with a purity of 99.999%. 100 mL of 5 M MEA solution was used in a continuous stirring-tank reactor to absorb carbon dioxide at 15% carbon dioxide, 313 K, and 1 atm pressure, which are typical absorber absorption conditions. The carbon dioxide was completely saturated and analyzed with a carbon dioxide saturated absorbent solution total organic carbon analyzer (Analytik Jena multi N/C 3100), showing 0.50±0.01 mol CO$_2$/mol MEA.

Figure 2:
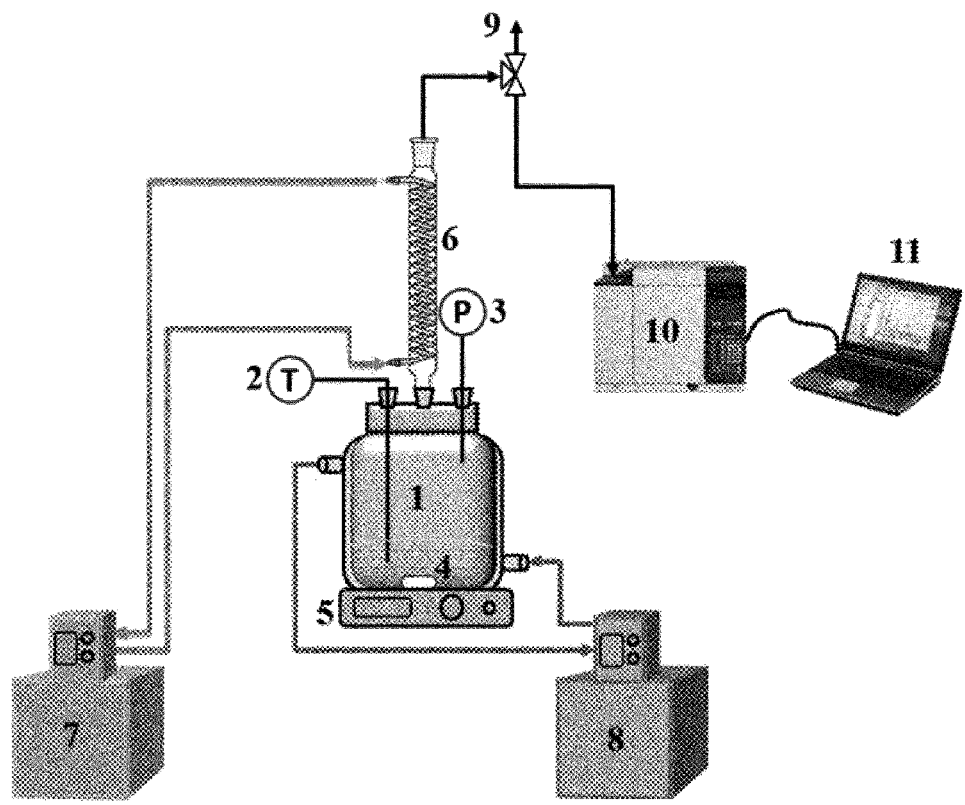
FIG. 2 illustrates a carbon dioxide absorbent regeneration experiment system according to an embodiment of the present invention.

Regeneration experiments of the carbon dioxide-absorbed absorbent were performed as shown in FIG. 2. The batch reactor 1 was connected to an oil circulator 8 to heat and maintain the amine solvent at the desired temperature. The solution was stirred at a speed of 200 rpm using a magnetic bar 4 in the solution for uniform heat distribution. A thermocouple 2 was inserted into the reactor to determine the temperature of the solution, and a pressure gauge 3 was installed to maintain the pressure inside the reactor. Condenser 6 was placed at the top of the reactor to condense and reflux water and amine vapors. An absorbent solution absorbing 100 mL of carbon dioxide was used in each experiment, and the absorbent solution was added to the reactor and heated by operating an oil circulator. As the temperature of the absorbent solution began to increase slowly, carbon dioxide gas was stripped from the solution. The stripped carbon dioxide discharged from the reactor was mixed with 50 cc/min of N2 gas, and the mixed gas was analyzed by gas chromatography (Agilent Technologies 7890A, 10). Each experiment was performed from 40° C. Each experiment was done twice, with an error of less than 5%, and the average value obtained from each experiment was recorded.

All experiments were carried out in a temperature rising step and an isothermal step. The temperature raising step is a step of gradually increasing the temperature of the solvent by heating until reaching the desired maximum temperature point of 91° C., and the isothermal step is a step in which the temperature is kept constant at the maximum desired point for 2 hours. The main purpose of the ascent step is to investigate the stripping performance of the catalyst solution at low temperatures and to record the carbon dioxide stripping profile of the MEA solvent without the catalyst as a function of temperature. The purpose of the 2 hour isothermal step is to assess the total amount of carbon dioxide stripped off at the maximum temperature point. The temperature range of 40-91° C. is the general absorption temperature of the absorbent at 40° C., and stripping performance is to be evaluated at the absorption temperature of 40° C. or higher. The maximum temperature, 91° C., was set to a temperature including 89° C. at which carbon dioxide was removed from the MEA alone without a catalyst.

Figure 3:
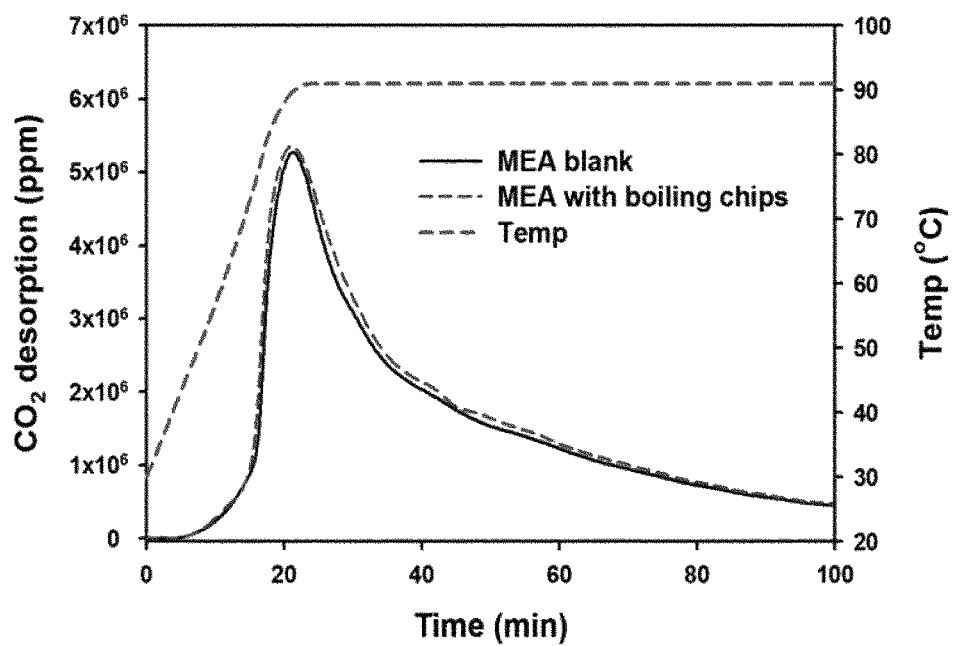
FIG. 3 is a comparison of the results of the absorbent regeneration experiment according to the presence of the boiling chips according to an embodiment of the present invention.

The results of the blank test using MEA alone without the catalyst were used as baseline, and apart from the catalytic activity, to find out the effect of the solid particles since the addition of the solid particles to the amine solution itself could affect the amine solvent regeneration, 5 parts by weight of the microporous carbon boiling chip compared to the 100 parts carbon dioxide absorbent solution was added to the MEA solvent and regeneration experiments were performed under the same conditions. FIG. 3 illustrates the result of comparing the absorbent regeneration test with and without boiling chip. Boiling chip addition had little effect on the carbon dioxide stripping step, and an experiment showed an increase of about 3.91% in the total amount of carbon dioxide stripped. This is because the addition of the solid particles has a slight effect, but does not have an effect on the temperature at which the absorbent is regenerated, and is considered to be a value that can be ignored.

Example 2 Analysis of Regeneration Effect of Carbon Dioxide Absorbent

Figure 4:
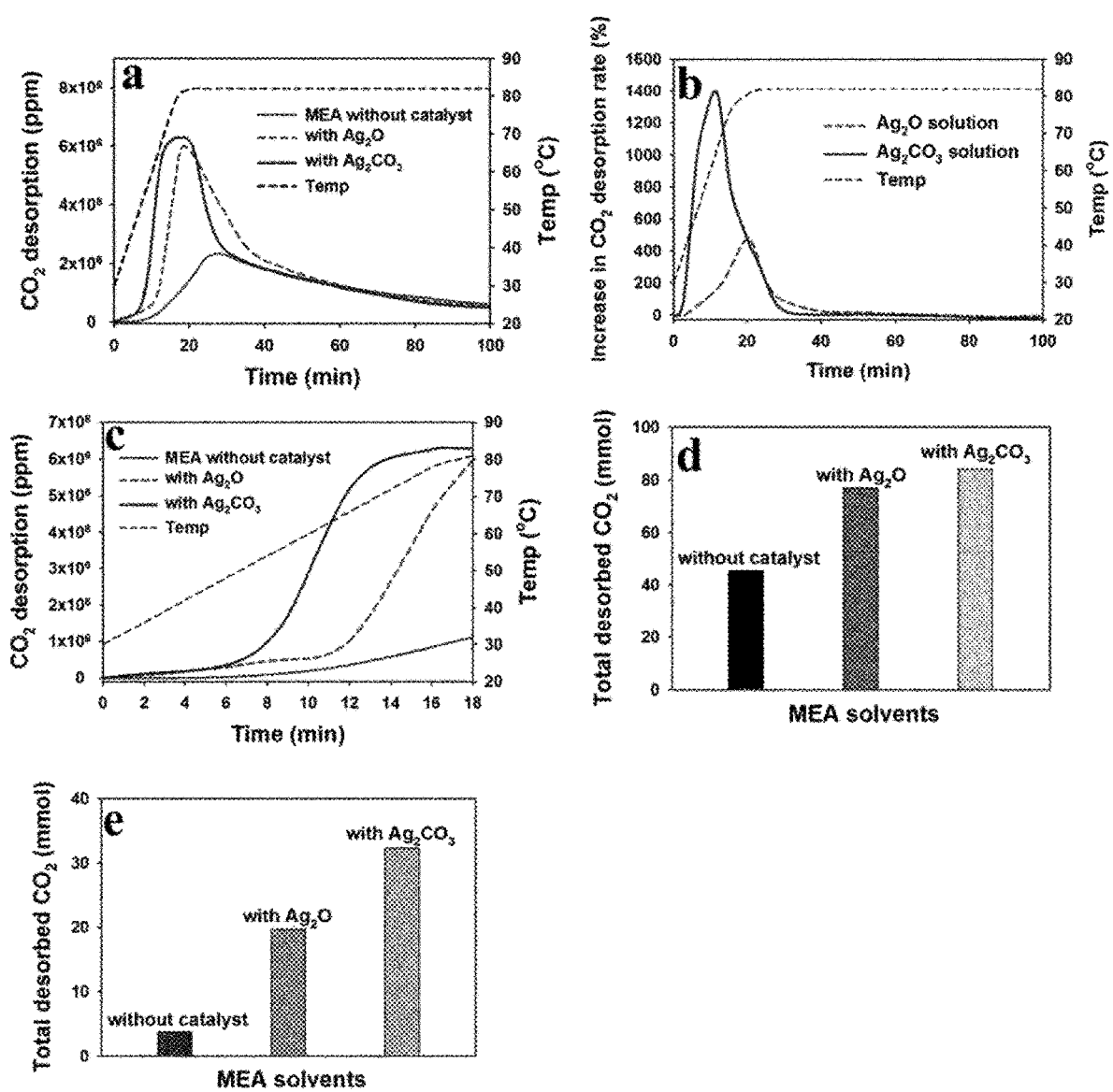
FIG. 4a to e are graphs of carbon dioxide stripping amount (a, c, d, e) and stripping rate (e) showing the regeneration effect of carbon dioxide absorbent with and without silver oxide and silver carbonate catalyst according to one embodiment of the present invention.

From a to e in FIG. 4 are carbon dioxide stripping curves showing the effect of regeneration of the absorbent over time and temperature. Removal of carbon dioxide from the MEA was carried out within the temperature range conditions set in accordance with Example 1, it was confirmed that the $Ag_2O$ and $Ag_2CO_3$ at the same temperature significantly increased the stripping amount and stripping rate of carbon dioxide. The results are shown in FIG. 4b. FIG. 4b is a graph of the relative velocity for the blank test (catalyst-free carbon dioxide stripping experiment). The temperature indicating the highest carbon dioxide stripping rate recorded for the $Ag_2O$ solution was 81° C., measured 470% higher at the same point than in the blank test solution without catalyst. FIG. 4c, which shows the removal of carbon dioxide at elevated temperatures, shows that the removal of $Ag_2O$ catalyst from the carbon dioxide-absorbed absorbent is very high compared to the blank test. The heat required for regeneration of higher carbon dioxide stripping absorbers than at lower temperatures can be reduced significantly, thus saving the required thermal energy.

Figure 5:
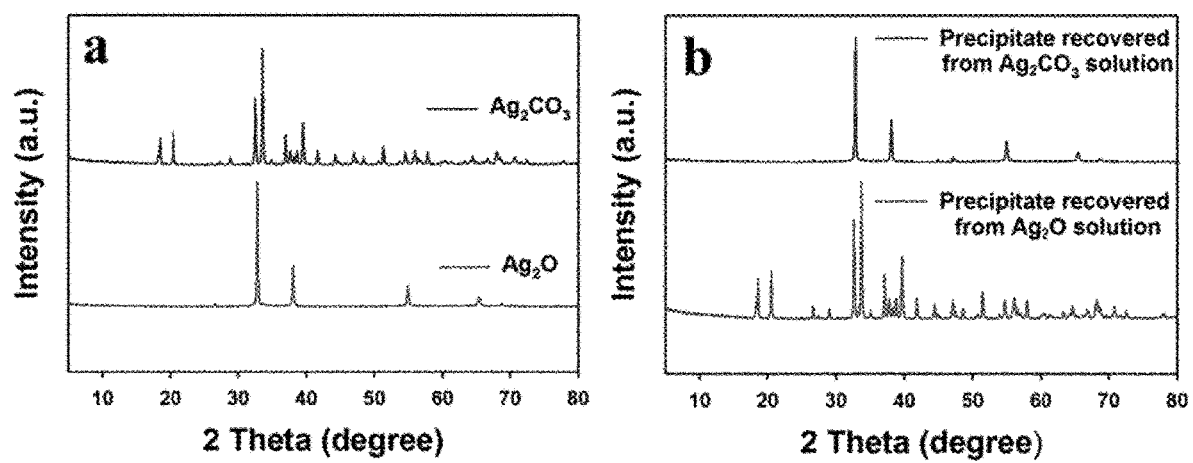
FIG. 5 illustrates the X-ray diffraction pattern (a) before and (b) after the silver oxide and silver carbonate catalyst and FT-IR spectrum (c) before and after the use of the silver oxide catalyst according to one embodiment of the present invention.
Figure 5:
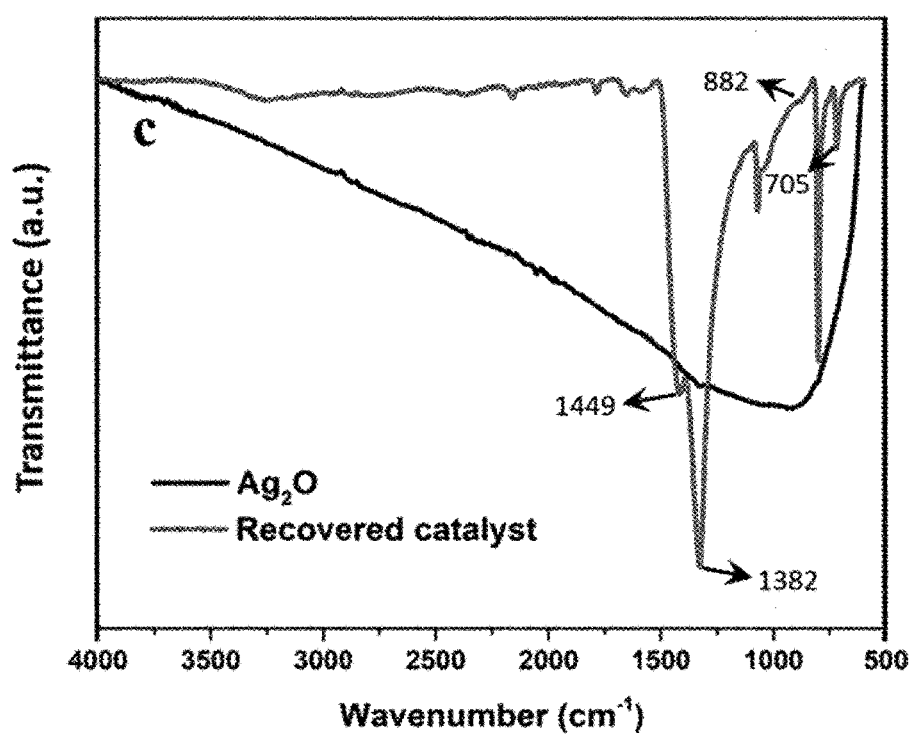

$Ag_2O$ is dissolved in a solution that absorbs carbon dioxide and the dissolution depends on the amount of carbon dioxide loaded and the regeneration temperature. The precipitate recovery after using the catalyst for carbon dioxide absorbent regeneration was about 62% and complete recovery of the catalyst can be achieved by lowering the pH of the solution. The precipitate recovered at the end of the $Ag_2O$ catalyst regeneration experiment was examined using XRD (FIGS. 5a and 5b) and FTIR (FIG. 5c) to confirm the presence of $Ag_2O$ and $Ag_2CO_3$. Referring to FIG. 5b, the $Ag_2CO_3$ catalyst is thought to decompose into $Ag_2O$ and carbon dioxide simultaneously with the catalytic reaction to remove carbon dioxide from the carbon dioxide-absorbed absorbent. Therefore, in order to examine the catalytic effect of $Ag_2CO_3$ obtained in the catalyst regeneration experiment, the regeneration experiment was repeated under the same conditions using $Ag_2O$ as a catalyst, and the carbon dioxide stripping effect was greater than that of the $Ag_2O$ catalyst. Referring to FIGS. 4a and 4b, the carbon dioxide stripping of the $Ag_2CO_3$ catalyst solution recorded the highest emission quantity and relative velocity (relative to the blank test) at 79° C., which was measured about 600% higher than the carbon dioxide stripping rate of the blank solution at the same temperature. In addition, the removal rate of carbon dioxide was measured to be improved by about 1400%. That is, it is believed that $Ag_2O$ and $Ag_2CO_3$ catalysts can perform significant carbon dioxide stripping at lower temperatures and the catalyst strips carbon dioxide through a new reaction path with low activation energy. That is, the carbon dioxide produced by the decomposition reaction of $Ag_2CO_3$ is added to the total carbon dioxide released from the solution. As such, $Ag_2O$ is converted to $Ag_2CO_3$, $Ag_2CO_3$ is converted back to $Ag_2O$, and the cycle is continued to achieve optimal carbon dioxide absorbent regeneration.

The mixed catalyst system of $Ag_2O$ and $Ag_2CO_3$ illustrates a very good catalytic effect on carbon dioxide absorbent regeneration. FIG. 4d shows the final $CO_2$ stripping of $Ag_2O$ and $Ag_2CO_3$ catalyst solutions and the non-catalyzed MEA solution, and the total amount of $CO_2$ stripped during each experiment was improved by about 69 and 85%. FIG. 4e compares the stripping amounts for each experimental group at the elevated temperature stages, and the improvement in carbon dioxide over the $Ag_2O$ and $Ag_2CO_3$ catalyst solutions showed an increase of about 426% and 767%, respectively. In the present invention, the carbon dioxide capture process is a continuous absorption/regeneration cycle of the absorbent and the amine solvent with high carbon dioxide concentration is continuously injected into the regeneration tower. Therefore, the improvement of carbon dioxide stripping rate and carbon dioxide stripping amount due to $Ag_2O$ and $Ag_2CO_3$ catalysts in the ramp-up phase is a substantial carbon dioxide stripping performance of the catalyst, which is considered to have a very good effect on absorbent regeneration in the carbon dioxide capture process.

Figure 6:
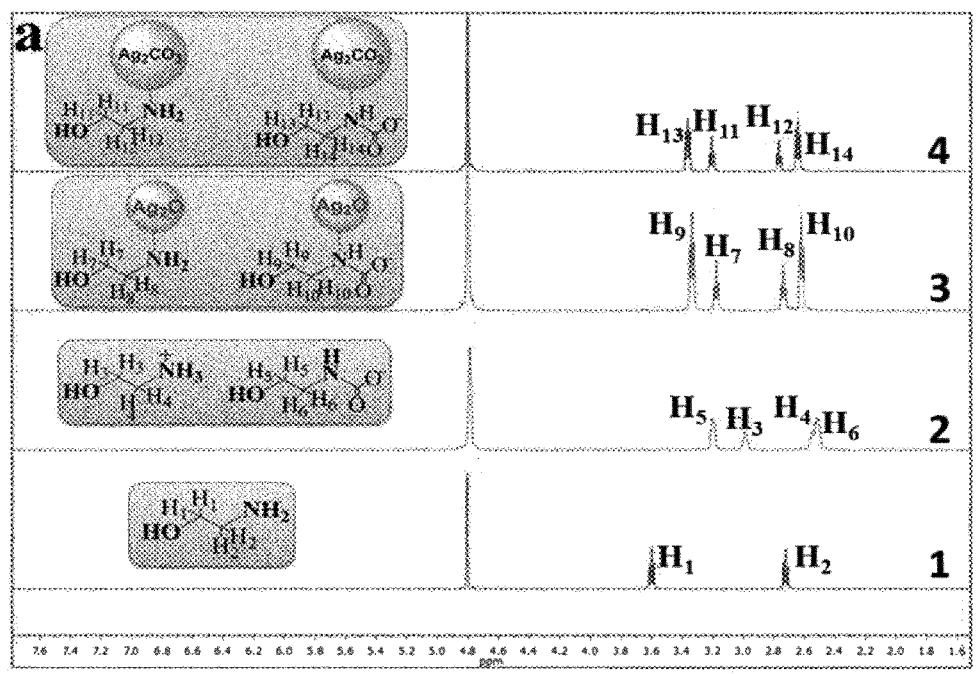
FIG. 6 is a (a) $^1H$ NMR results and (b) $^{13}c$ NMR results to determine the chemically bonded species of the silver oxide and silver carbonate catalyst in the carbon dioxide-absorbed absorbent solution according to an embodiment of the present invention.
Figure 6:
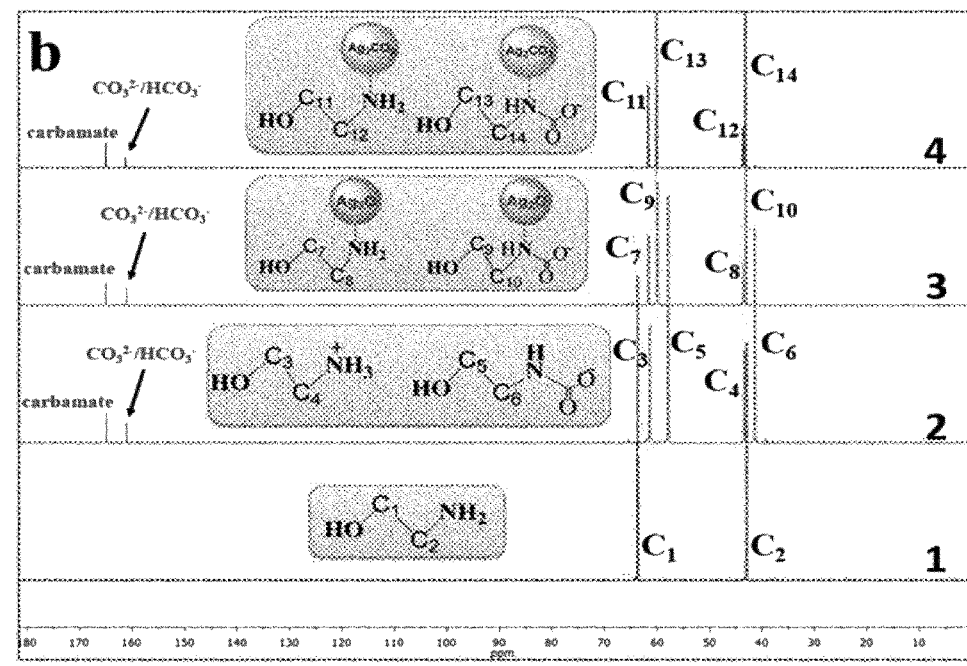

To investigate the catalyst's reaction pathway, $^1H$ and $^{13}C$ NMR spectra for MEA, $Ag_2O$ and $Ag_2CO_3$ before and after carbon dioxide loading were measured and shown in FIG. 6. Free MEA protons in the MEA-$H_2O$ and MEA-$H_2O$—$CO_2$ systems showed two triple peaks at 3.60 ppm and 2.72 ppm, respectively for —CH$_2$OH and —CH$_2$NH$_2$ (FIG. 6a 1), and species generated after loading carbon dioxide were carbamate and protonated MEA (MEAH+). Respective peaks for MEAH+ appeared at 3.19 (t) ppm and 2.53 (t) ppm, and the corresponding carbamate peaks were 2.99 (t) ppm and 2.55 (t) ppm (FIG. 6a 2). Changes in the chemical changes of MEA protons after carbon dioxide loading have been compared with the report in the previous paper [13.C. Perinu, B. Arstad, K. J. Jens, Int. J. Greenh. Gas Con. 2014, 20, 230-243.]. FIG. 6a 3 shows the MEA-H$_2$O—CO$_2$—Ag$_2$O $^1$H NMR spectrum with Ag$_2$O added to MEA solution containing carbon dioxide and the possible interaction between Ag$_2$O and carbamate, and it was confirmed that the chemical shifts of MEAH+ and carbamate species changed. The amine radical of the carbamate binds to Ag$_2$O and the chemical shift of the carbamate protons is changed. FIG. 6a 4 shows the MEA-H$_2$O—CO$_2$—Ag$_2$O $^1$H NMR spectrum with Ag$_2$CO$_3$ added to a carbon dioxide-containing MEA solution, and the chemical structure showing possible interactions between Ag$_2$CO$_3$ and carbamate, and It was found that the chemical shifts of MEAH+ and carbamate species changed similarly with the case of addition of Ag$_2$O. These results indicate that in the solvent regeneration step, the two catalysts perform a similar interaction with the carbon dioxide-absorbed absorbent solution.

FIG. 6b is a $^{13}$C NMR spectrum, where the blank MEAs in FIG. 6b 1 have two peaks at 63.98 and 42.62 ppm, and after the carbon dioxide loading, the six peaks were observed as shown in FIG. 6b 2. Peaks at 164, 61.31 and 57.70 ppm were due to carbamate, and peaks at 43.16 and 41.24 ppm were due to MEAH$^+$. The peak appearing at 160.9 ppm confirmed the presence of bicarbonate (HCO$_3^-$). The peak obtained has been compared with previously reported one [13.C. Perinu, B. Arstad, K. J. Jens, Int. J. Greenh. Gas Con. 2014, 20, 230-243.]. When Ag$_2$O and Ag$_2$CO$_3$ were added to the carbon dioxide-loaded MEA solution, the chemical interaction of carbamate and MEAH$^+$ occurred due to the interaction of carbamate with MEAH$^+$ and the catalyst as shown in FIG. 6b 3 and 4, which acted as a catalyst to remove carbon dioxide.

Figure 7:
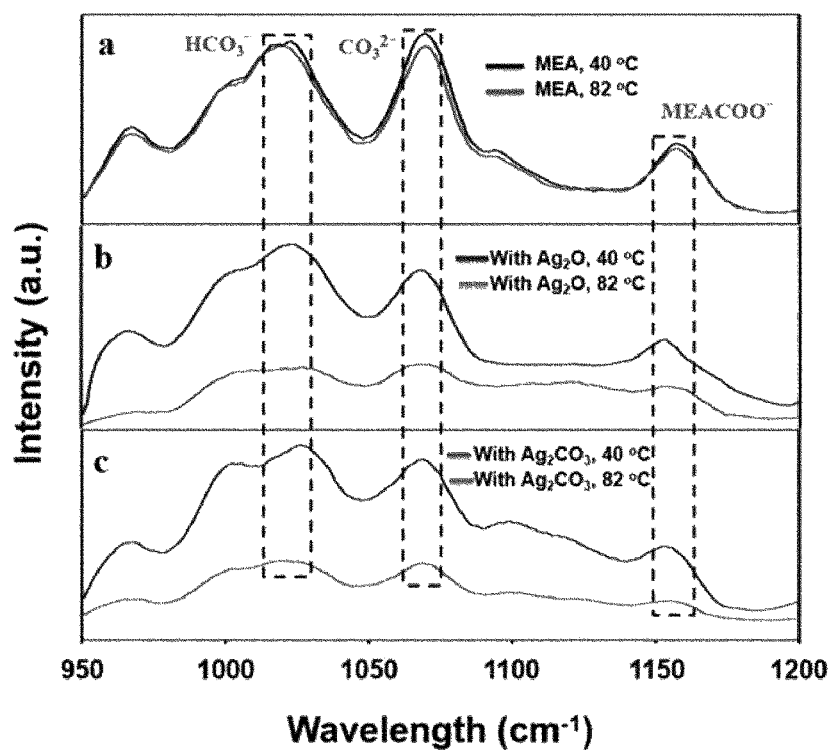
FIG. 7 illustrates the Raman spectra with and without the use of silver oxide and silver carbonate catalysts for carbon dioxide absorbent regeneration according to one embodiment of the invention.

The Raman spectroscopy was used to analyze the catalytic effect of Ag$_2$O and Ag$_2$CO$_3$ on carbon dioxide stripping in more detail. As soon as the initial stage of the experiment (e.g. 40° C.) and the maximum temperature point (e.g. 82° C.) were achieved, the blank MEA, Ag$_2$O added MEA and Ag$_2$CO$_3$ added MEA samples were measured, respectively, and the results are shown in FIG. 7. The peaks shown at 1015, 1066 and 1155 cm$^{-1}$ are due to the C—OH stretching of HCO$_3^-$, the C—O stretching of CO$_3^{2-}$ and the C—N stretching of MEACOO—. In the case of catalyst-free MEA, the strengths of HCO$_3^-$, CO$_3^{2-}$ and MEACOO$^-$ hardly decreased, which means that carbon dioxide stripping from the MEA without catalyst solution is limited. On the other hand, when the Ag$_2$O (FIG. 7b) and Ag$_2$CO$_3$ (FIG. 7c) catalysts were added respectively, the strengths of HCO$_3^-$, CO$_3^{2-}$ and MEACOO$^-$ decreased dramatically, so it was confirmed that the two catalysts interacted with three carbon dioxide-containing species to substantially remove carbon dioxide. These results suggest that both catalysts can perform regeneration of carbon dioxide absorbent at low temperature with good efficiency.

Figure 8:
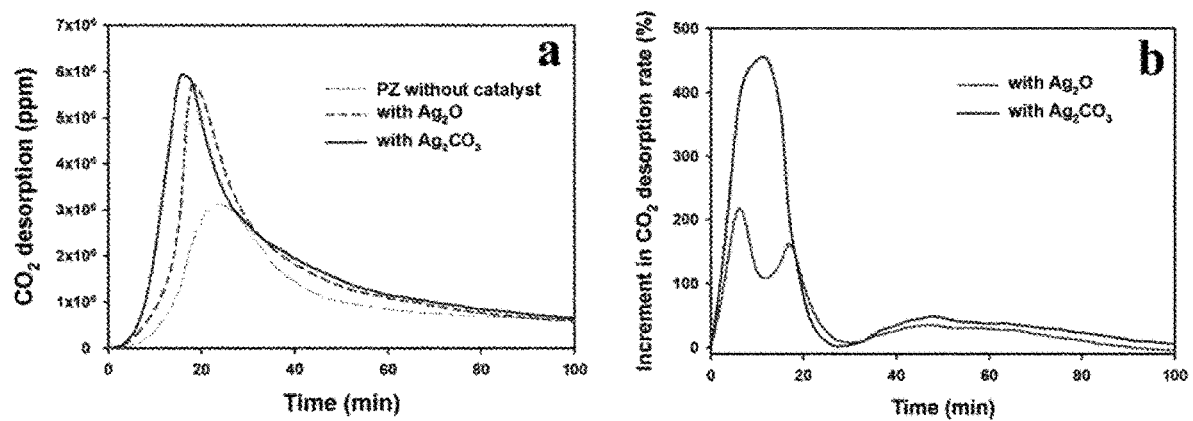
FIG. 8 is a graph of the (a) carbon dioxide stripping amount and (b) stripping rate to analyze the activity of the silver oxide and silver carbonate catalyst using piperazine as a carbon dioxide absorbent according to an embodiment of the present invention.

The regeneration performance of the piperazine (PZ, cyclic diamine solvent) commonly used as a carbon dioxide absorbent was analyzed. The experiment was carried out under the same experimental conditions, and the results are shown in FIG. 8. By the same catalytic effect as in the experiment of the MEA absorbent described above, Ag$_2$O was converted to Ag$_2$CO$_3$, and Ag$_2$CO$_3$ was converted to Ag$_2$O and showed a catalytic effect. Referring to FIG. 8a, the catalyst showed about 450% improved regeneration performance, and about 280% more carbon dioxide was removed during the temperature rising step. The Ag$_2$O and Ag$_2$CO$_3$ mixed catalysts of the present invention can be easily combined with carbamate, bicarbonate, and carbonate species to cause the two catalysts to release carbon dioxide at low temperature, causing chemical changes thereof, by reversibly converting oxides and carbonates, the amine-based carbon dioxide absorbent solution can be efficiently recycled.

Carbon dioxide absorbent regeneration method using the metal oxide catalyst of the present invention, compared to the existing regeneration temperature of about 120° C. of the amine-based absorbent regeneration method using only conventional thermal energy, the carbon dioxide absorbent can be regenerated at a high speed at a significantly lower temperature 40 to 85° C. In addition, the catalyst efficiency can be maintained even when the catalyst is reused. This saves the required heat energy and stripping time, which can result in very good energy savings throughout the process.

While one or more embodiments have been described above with reference to the figures, it will be understood by those of ordinary skill in the art that various changes in form and details may be made therein without departing from the spirit and scope as defined by the following claims. Unless otherwise defined, terms used herein have the meaning as commonly understood by one of ordinary skill in the art to which this invention pertains. All references, including publications, patent documents, and non-patent documents cited herein are incorporated herein in their entirety by reference.

The invention claimed is:

1. A method for regenerating an amine-based, acid gas absorbent using a catalyst mixture containing silver oxide and silver carbonate, the method comprising the steps of:
    absorbing an acid gas into an acid gas absorbent having an amine group to obtain an acid gas-absorbed absorbent; and
    regenerating the acid gas absorbent by adding a catalyst mixture containing silver oxide and silver carbonate to the acid gas-absorbed absorbent and by removing the acid gas at a temperature ranging from 40° C. to 86° C.

2. The method for regenerating an amine-based, acid gas absorbent of claim 1, wherein the acid gas absorbent having an amine group is selected from the group consisting of monoethanolamine (MEA), diethanolamine (DEA), triethanolamine (TEA), tetraethylenepentamine (TEPA), triethylenetetramine (TETA), N-methyl diethanolamine (MDEA), 3-isobutoxypropylamine, dimethylaminoethylamine, diglycolamine (DGA), hexylamine, 2-amino-2-methylpropanol (AMP), hexamethylenediamine (HMDA), propylamine, dipropylamine, butylamine, isobutylamine, 2-ethylhexylamine, 4-aminobutanol, 3-Methoxypropylamine, allylamine, methyldiallylamine, pentylamine, isoamylamine, N-methylethylamine, 2-octylamine, 2-hydroxyethylaminopropylamine, piperazine, triisopropanolamine (TIPA), and combinations thereof.

3. The method for regenerating an amine-based, acid gas absorbent of claim 1, wherein the amine-based, acid gas absorbent is monoethanolamine (MEA) or piperazine.

4. The method for regenerating an amine-based, acid gas absorbent of claim 1, wherein the catalyst mixture is added in an amount of 0.1 to 20 parts by weight based on weight of the acid gas absorbent.

5. The method for regenerating an amine-based, acid gas absorbent of claim 1, wherein the catalyst mixture containing the silver oxide and the silver carbonate is mixed in a weight ratio of the silver oxide to the silver carbonate ranging from 1:0.1 to 1:2.

6. The method for regenerating an amine-based, acid gas absorbent of claim 1, wherein the method further comprises the steps of:
   reusing a regenerated acid gas absorbent for absorbing the acid gas;
   recovering the catalyst mixture to provide a recovered catalyst mixture; and
   reusing the recovered catalyst mixture to regenerate the acid gas-absorbed absorbent.

7. The method for regenerating an amine-based, acid gas absorbent of claim 1, wherein the amine-based, acid gas absorbent is an absorbent solution, wherein the acid gas that is absorbed into the absorbent solution is carbon dioxide, and wherein the catalyst mixture promotes decomposition of carbon dioxide-bound carbamate in the absorbent solution that absorbs the carbon dioxide.

* * * * *